United States Patent [19]

Miyamoto

[11] 4,225,974
[45] Sep. 30, 1980

[54] DOUBLE SUPER-HETERODYNE RECEIVER

[75] Inventor: Yukihiko Miyamoto, Tokyo, Japan

[73] Assignee: Trio Kabushiki Kaisha, Tokyo, Japan

[21] Appl. No.: 846,104

[22] Filed: Oct. 27, 1977

[30] Foreign Application Priority Data

Feb. 14, 1977 [JP] Japan .................................. 52-14803

[51] Int. Cl.$^2$ ............................................ H04B 1/26
[52] U.S. Cl. .................................... 455/207; 455/315
[58] Field of Search ............... 325/344, 345, 431, 432, 325/433, 436, 437, 460, 308

[56] References Cited

U.S. PATENT DOCUMENTS

| 3,433,903 | 3/1969 | Murray et al. | 325/432 |
|---|---|---|---|
| 3,603,885 | 9/1971 | Bartholomew | 325/432 |
| 3,614,627 | 10/1971 | Runyan | 325/345 |
| 3,639,840 | 2/1972 | Shekel et al. | 325/308 |
| 3,942,120 | 3/1976 | Ham | 325/344 |
| 4,027,242 | 5/1977 | Yamanaka | 325/433 |

OTHER PUBLICATIONS

"The Radio Experimenter's Magazine", 11/1976, pp. 327-332, by Kumagai.

Primary Examiner—Robert L. Griffin
Assistant Examiner—Jin F. Ng
Attorney, Agent, or Firm—Gerald J. Ferguson, Jr.; Joseph J. Baker

[57] ABSTRACT

A double superheterodyne receiver comprising a first mixer responsive to a frequency modulated signal and a first local oscillator signal for providing a first intermediate frequency signal having a frequency $f_1$ and a positive side frequency deviation of $+\Delta f_1$ and a negative side frequency deviation of $-\Delta f_2$ where $\Delta f_1 = \Delta f_2$, a second mixer responsive to the first intermediate frequency signal and a second local oscillator signal having a frequency $f_s$ for providing a second intermediate frequency signal having a frequency of $f_2$ and harmonics $nf_2$ and $(n+1)f_2$ where n is positive integer indicating the harmonic of $f_2$ in the lower side of $f_1$ which substantially deviates to $f_1 + \Delta f_1$ or to $f_1 - \Delta f_2$ and $n+1$ indicates the harmonic of $f_2$ in the upper side of $f_1$ which substantially deviates to $f_1 - \Delta f_2$ (when $nf_2$ substantially deviates to $f_1 + \Delta f_1$) or to $f_1 + \Delta f_1$ (when $nf_2$ substantially deviates to $f_1 - \Delta f_2$).

9 Claims, 3 Drawing Figures

FIG. 1
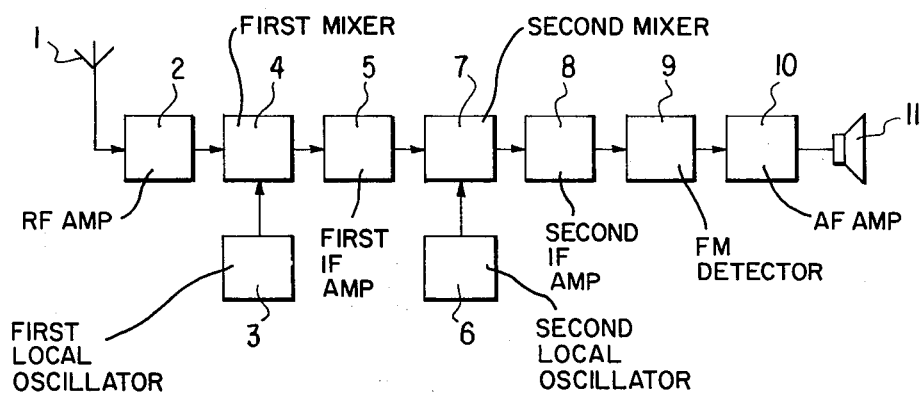
FIG. 2
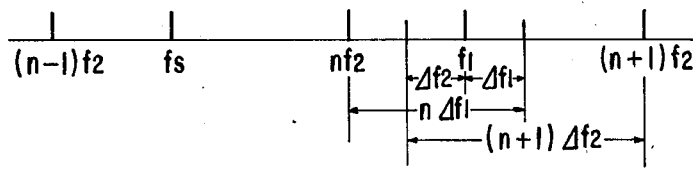
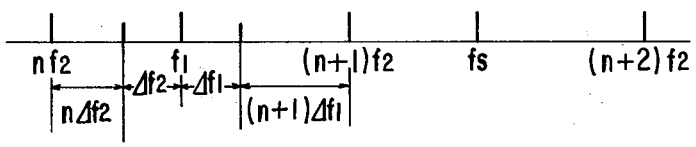
FIG. 3

DOUBLE SUPER-HETERODYNE RECEIVER

BACKGROUND OF THE INVENTION

This invention concerns a double super heterodyne receiver.

In general, because carrier waves are amplified by two narrow-band amplification circuits, consisting of a radio frequency amplification circuit and an intermediate frequency amplification circuit, super heterodyne receivers are characterized by their ability to stabilize carrier wave amplification to the detector and by suitable selectivity.

However, FM receivers involve the following. Carrier waves reaching the FM receiver are obstructed by noise within the passband of the selective amplifier up to the FM detector. That appears as so-called FM noise in the output of the FM detector. However, this noise diminishes in inverse proportion to the electrical power of the carrier wave reaching the receiver. In other words, it is proportional to the signal-to-noise (SN) ratio. Accordingly, since the FM noise is below the residual noise of the FM detector at a sufficient carrier wave level, the limit of the SN ratio of the receiver demodulation output would be determined by the ratio of the FM detector output to the residual noise of the detector. The residual noise of the FM detector varies with the design, and improvement must be made in the products which constitute the FM receiver in order to reduce this noise. The SN ratio of the FM detector output can also be improved by improving the detection efficiency, however.

With this in mind, we will next investigate the properties of the FM detector from the demodulation theory of FM waves. In FM wave detection, FM waves are imposed on a circuit in which the amplitude or phase changes linearly in relation to the deviation in frequency and detection is carried out by detection of the phase or amplitude deviation of the output signal. FM detectors using the former method include twin tuning detectors, Forster Seeley detectors and radio detectors, while FM detectors using the latter method include quadrature detectors and pulse count type detectors.

We will first consider the properties of an FM detector based on the first method.

When the frequency modulated wave is modulated by the modulating wave S(t) expressed by the following formula (1), the frequency modulated wave i(t) is represented by formula (2):

$$S(t) = I_s \cos pt \quad (1)$$

$$i(t) = I_O \sin (\omega_O t + m_f \sin pt). \quad (2)$$

In formula (2), however, $I_O$ is the amplitude of the carrier wave, $\omega_O$ is the angular frequency of the carrier wave and $m_f$ is the modulation index. The modulation index $m_f$ is represented by the following formula when the maximum angular frequency deviation is taken as $\Delta\omega$ and the constant is K.

$$m_f = (\Delta\omega/p) = (KI_s/p.) \quad (3)$$

When a frequency modulated wave i(t) is imposed on a circuit whose output frequency changes linearly in relation to the frequency, such as a differential circuit, the output i'(t) would be represented as follows:

$$i'(t) = I_O \omega_O (1 + m_a \cos pt) \cos (\omega_O t + m_f \sin pt). \quad (4)$$

The following is also true:

$$m_a = \Delta\omega/\omega_O. \quad (5)$$

Specifically, if the frequency modulated wave i(t) passes through the differential circuit, the output will be a amplitude modulated wave with modulation index $m_a$ and envelope cos pt. Accordingly, demodulation of the frequency modulated wave is possible if envelope line detection of this output i'(t) is conducted. If we assume that the maximum angular frequency deviation $\Delta\omega$ is constant, then the degree of modulation $m_a$ increases as the angular frequency of the carrier wave $\omega_O$ decreases.

Next we will consider the properties of an FM detector based on the second method. When the frequency modulated wave i(t), represented by the same formula (2) as in the previous case, is imposed on a circuit in which the output phase deviates linearly in relation to the frequency deviation, such as a phase shift circuit, the following formula develops, assuming the central phase angle of the carrier wave angular frequency $\omega_O$ to be $\theta_O$, the deviation of the output phase angle in relation to frequency change to be $\tau$ and the phase differential in relation to the input of the phase shift circuit output to be $\theta(t)$.

$$\theta(t) = \theta_0 + [\omega(t) - \omega_0]\tau \quad (6)$$
$$= \theta_0 + \tau\Delta\omega \cos pt.$$

$\tau$ is called the delay time of the phase shift circuit. Accordingly, demodulation of the frequency modulated wave would be possible if an electronic circuit were designed in which the voltage were proportional to the phase difference between the output side and the input side of the phase shift circuit expressed in formula (6). If the maximum angular frequency deviation $\Delta\omega$ were assumed to be constant, the phase difference would increase directly with the delay time $\tau$. Thus, a large demodulation signal would be achieved. In addition, the delay time $\tau$ would be greater in relation to the phase shift circuit of same structure as the angular frequency of the carrier wave $\omega_O$ became smaller. Using a pulse counter detector as an example, the pulse width would be greater the smaller the carrier wave frequency. This is the selection of a large delay time $\tau$.

As indicated above, if the maximum angular frequency deviation $\Delta\omega$ is constant, the FM detector will have the property of an improved detection efficiency the smaller the carrier wave angle frequency $\omega_O$. Accordingly, the use of the super heterodyne method in the FM receiver would result in higher detection efficiency, improved SN ratio and the ready achievement of a better SN ratio the lower the intermediate frequency selected.

However, the intermediate frequency amplification circuit in the FM receiver ensures the necessary occupied bandwidth in FM broadcast and reception and, since selective amplification with a sufficient bandwidth in relation to fluctuation of the oscillation frequency of the local oscillator must be conducted, the intermediate frequency cannot be easily lowered. The double super heterodyne method was conceived to eliminate such problems. Specifically, the first intermediate frequency is set at the frequency value so that said problems do not develop. Frequency conversion of this first intermediate frequency is repeated and a second intermediate frequency is achieved with a still lower frequency value. The detection efficiency by FM detection is improved.

However, although the double super heterodyne method solves various problems, it does give rise to new ones. Specifically, when the first intermediate frequency output or the second local oscillator output leaked out in the second intermediate frequency output, the frequency value of the higher harmonic of the second intermediate frequency approaches the values of the first intermediate frequency or of the second local oscillator output frequency and a beat component develops with frequency equal to the difference between the two. This beat component appears in the demodulation output as noise.

SUMMARY OF THE INVENTION

This invention provides a double super heterodyne FM receiver which eliminates disturbance due to the beat component which develops between the higher harmonic frequency of said second intermediate frequency and the first intermediate frequency or the second local oscillator output.

This invention will be described below with reference to one example in the figures.

BRIEF DESCRIPTION OF THE DRAWING

FIG. 1 is a block diagram of an example of a double superheterodyne FM receiver of this invention, while FIGS. 2 and 3 are illustrations which describe the invention operation.

DETAILED DESCRIPTION OF PREFERRED EMBODIMENTS OF THE INVENTION

FIG. 1 is a block diagram of an example of a double super heterodyne FM receiver using this invention. 1 is the antenna, 2 is the radio frequency amplification circuit, 3 is the first local oscillation circuit, 4 is the first mixer circuit, 5 is the first intermediate frequency amplification circuit, 6 is the second local oscillation circuit, 7 is the second mixer circuit, 8 is the second intermediate frequency amplification circuit, 9 is the FM detection circuit, 10 is the audio frequency amplification circuit, and 11 is the speaker. The first local oscillation circuit 3 is a variable oscillation circuit for tuning while the second local oscillation circuit 6 is a fixed oscillation circuit.

In the circuit design according to this invention, the second intermediate frequency $f_2$ is set so that the first intermediate frequency (called $f_1$) resulting from the first mixer circuit 4 is situated in the dynamic center of the nth order higher harmonic frequency $nf_2$ of the second intermediate frequency resulting from the second mixer circuit 7 (called $f_2$) and the $N+1$st order higher harmonic frequency $(n+1)f_2$. n is a positive integer.

Here we will explain the meaning of 'dynamic'. In the case of the lower side heterodyne, the following expression results when the second local oscillation frequency is taken as $f_s$:

$$f_2 = f_1 - f_s. \quad (7)$$

When the first intermediate frequency $f_1$ changes due to frequency deviation of the received FM waves or due to detuning, the amount of positive side change is assumed to be $+\Delta f_1$ while the amount of negative side change is assumed to be $-\Delta f_2$. If the nth order higher harmonic frequency of the second intermediate frequency $f_2$ which is nearest in the lower side of the first intermediate frequency $f_1$ were taken as $nf_2$ and if the $(n+1)$st order higher harmonic frequency of the second intermediate frequency $f_2$ which is nearest in the upper side were taken as $(n+1)f_2$, $nf_2$ and $(n+1)f_2$ would undergo changes of only $+n\Delta f_1$ and $+(n+1)f_2$, respectively, when the first intermediate frequency $f_1$ changed by $+\Delta f_1$, while the changes in $nf_2$ and $(n+1)f_2$ would be $-n\Delta f_2$ and $-(n+1)f_2$, respectively, if the first intermediate frequency $f_1$ changed by an amount $-\Delta f_2$. Accordingly, when the first intermediate frequency $f_1$ undergoes a change of $+\Delta f_1$ the following formula will emerge if we assume the development of a beat component between it and the nth order higher harmonic frequency of the second intermediate frequency $f_2$ after the accompanying change of $+n\Delta f_1$:

$$f_1 + \Delta f_1 = n(f_2 + \alpha f_1). \quad (8)$$

At the same time, if the first intermediate frequency $f_1$ undergoes a change $-\Delta f_2$, the following formula will emerge if we assume the development of a beat component between it and the $(n+1)$st order higher harmonic frequency of the second intermediate frequency $f_2$ after the accompanying change of $-(n+1)f_2$:

$$f_1 - \Delta f_2 = (n+1)(f_2 - \Delta f_2). \quad (9)$$

Formula (10) emerges in both formulas (8) and (9):

$$\Delta f_1 = \Delta f_2 (= \Delta f). \quad (10)$$

If the frequency values of the first intermediate frequency $f_1$ and second intermediate frequency $f_2$ are chosen in this manner, then when the first intermediate frequency $f_1$ deviates, the beat component between the nth order higher harmonic frequency of the second intermediate frequency $f_2$ and the $(n+1)$st order higher harmonic frequency present in both sides of the first intermediate frequency $f_1$ will develop least.

Thus, the following formula will be derived, to find the second intermediate frequency $f_2$ from formulas (8), (9) and (10):

$$f_2 = \frac{2n-1}{2n^2-1} f_1. \quad (11)$$

In addition, formula (12) will emerge, to find the second local oscillation frequency $f_2$ from formulas (7) and (11):

$$f_s = \frac{2n(n-1)}{2n^2-1} f_1. \quad (12)$$

FIG. 2 illustrates the frequency positional relation in the case of the lower heterodyne noted previously.

The following expression emerges in the case of the upper side hetrodyne:

$$f_2 = f_s - f_1. \quad (13)$$

In this case, when the first intermediate frequency $f_1$ undergoes frequency deviation, the second intermediate frequency $f_2$ undergoes a frequency deviation in the relation opposite that in the case of the lower side heterodyne. Accordingly, the following formula emerges upon the $+\Delta f_1$ change of the first intermediate frequency and the accompanying $-(n+1)\Delta f_1$ change, whereupon the beat component develops between it and the (n+1)st order higher harmonic frequency of the second intermediate frequency $f_2$.

$$f_1 + \Delta f_1 = (n+1)(f_2 - \Delta f_1). \tag{14}$$

At the same time, when the first intermediate frequency $f_1$ undergoes a change $-\Delta f_2$, the following formula emerges upon the development of a beat component between it and the nth order higher harmonic of the second intermediate frequency $f_2$ after the accompanying change of $+n\Delta f_1$:

$$f_1 - \Delta f_2 = n(f_2 + \Delta f_2). \tag{15}$$

Thus, the following formula emerges to find the second intermediate frequency $f_2$, by substituting the conditions of formula (1) into formulas (14) and (15), so that the first intermediate frequency $f_1$ lies in the dynamic center of the higher harmonic frequency of the second intermediate frequency $f_2$:

$$f_2 = \frac{2n+3}{(n+1)^2 + n(n+2)} f_1. \tag{16}$$

In addition, the following formula emerges to find the second local oscillation frequency $f_s$ through formulas (13) and (16):

$$f_s = \frac{2(n+1)(n+2)}{(n+1)^2 + n(n+2)} f_1. \tag{17}$$

FIG. 3 illustrates the frequency positional relation in the case of the upper heterodyne noted previously.

As indicated above, elimination of the beat component which develops between the second local oscillation frequency $f_s$ and the higher harmonic frequency of the second intermediate frequency $f_2$ can be achieved by establishment of the second intermediate frequency $f_2$; the details are omitted here.

This invention will next be discussed in the case of use of FM stereo receivers currently in operation.

Since current FM stereo receivers involve $f_1 = 10.7$ MHz, in the case of lower side heterodynes, $n = 5$ when the demodulation bandwidth is considered and the peak conversion ratio is sought for the SN ratio. Accordingly, when $f_1 = 10.7$ MHz and $n = 5$ are substituted into formula (11), $f_2 = 1.965$ MHz develops.

As noted above, using this invention, since the second intermediate frequency in the double super heterodyne FM receiver is designed so that the first intermediate frequency will be situated in the dynamic center between the nth order higher harmonic of the second intermediate frequency and the (n+1)st order higher harmonic frequency, the disturbance due to the beat component which develops between the higher harmonic frequency of the second intermediate frequency and the first intermediate frequency or the second local oscillation output can be minimized. This simplifies the design of the second intermediate frequency filter and disturbance would not even develop if the higher harmonic component of the second intermediate frequency which develops in the detector, etc. were to rush into the first intermediate frequency amplification state due to radiation.

Thus, if the double super heterodyne method of this invention is applied with establishment of the second intermediate frequency and combination with a linear detector in that frequency band, such as a pulse counter detector, a fine FM receiver would result without beat disturbance, with improved detection efficiency and an improved SN ratio.

I claim:

1. A method of double superheterodyning a frequency modulated signal comprising the steps of
   mixing the frequency modulated signal with a first local oscillator signal to provide a first intermediate frequency signal having a frequency $f_1$ and a positive side frequency deviation of $+\Delta f_1$ and a negative side frequency deviation of $-\Delta f_2$ where $\Delta f_1 = \Delta f_2$, and then
   mixing the first intermediate frequency signal with a second local oscillator signal having a frequency $f_s$ less than $f_1$ to provide a second intermediate frequency signal having a frequency of $f_2$ and harmonics $nf_2$ and $(n+1)f_2$ where the relationship between $f_1$ and $f_2$ is such that n is a positive integer indicating the harmonic of $f_2$, $nf_2$, in the lower side of $f_1$ which substantially deviates to $f_1 + \Delta f_1$ and $n+1$ indicates the harmonic of $f_2$, $(n+1)f_2$, in the upper side of $f_1$ which substantially deviates to $f_1 - \Delta f_2$.

2. A method as in claim 1 where $f_1 = 10.7$ MHz.

3. A method as in claim 1 where $\Delta f_1 = \Delta f_2 = \Delta f$ and where $2\Delta f$ corresponds to the demodulation bandwidth.

4. A method as in claim 3 where $f_1 = 10.7$ MHz.

5. A method as in claim 4 where $f_2$ substantially is 1.965 MHz.

6. A method of double superheterodyning a frequency modulated signal comprising the steps of
   mixing the frequency modulated signal with a first local oscillator signal to provide a first intermediate frequency signal having a frequency $f_1$ and a positive side frequency deviation of $+\Delta f_1$ and a negative side frequency deviation of $-\Delta f_2$ where $\Delta f_1 = \Delta f_2$, and then
   mixing the first intermediate frequency signal with a second local oscillator signal having a frequency $f_s$ greater than $f_1$ to provide a second intermediate frequency signal having a frequency of $f_2$ and harmonics $nf_2$ and $(n+1)f_2$ where the relationship between $f_1$ and $f_2$ is such that n is a positive integer indicating the harmonic of $f_2$, $nf_2$, in the lower side of $f_1$ which substantially deviates to $f_1 - \Delta f_1$ and $n+1$ indicates the harmonic of $f_2$, $(n+1)f_2$, in the upper side of $f_1$ which substantially deviates to $f_1 + \Delta f_2$.

7. A method as in claim 6 wherein $f_1 = 10.7$ MHz.

8. A method as in claim 6 where $\Delta f_1 = \Delta f_2 = \Delta f$ and where $2\Delta f$ corresponds to the demodulation bandwidth.

9. A method as in claim 8 where $f_1 = 10.7$ MHz.

* * * * *